United States Patent [19]
Elias et al.

[11] Patent Number: 5,151,456
[45] Date of Patent: Sep. 29, 1992

[54] EMULSIFIED SEALANT HAVING A HIGH SOLIDS CONTENT

[75] Inventors: Samir F. Elias, Wichita; Kevin Klausmeyer, Clearwater; Kurt Holland, Pratt, all of Kans.

[73] Assignee: Koch Industries, Inc., Wichita, Kans.

[21] Appl. No.: 706,382

[22] Filed: May 28, 1991

[51] Int. Cl.$^5$ .............................................. B01J 13/00
[52] U.S. Cl. ..................................... 524/60; 252/311.5; 252/314; 106/277; 427/138; 427/208.8; 524/68
[58] Field of Search ..................... 252/311.5; 106/277; 524/60, 68; 427/138, 208.8

[56] References Cited

U.S. PATENT DOCUMENTS

| | | | |
|---|---|---|---|
| 4,419,489 | 12/1983 | Grossi | 525/54.5 |
| 4,433,084 | 2/1984 | Ostermeyer et al. | 524/62 |
| 4,485,201 | 11/1984 | Davis | 524/68 |
| 4,745,155 | 9/1986 | Grossi | 525/54.5 |
| 4,772,647 | 9/1988 | Grossi et al. | 324/60 |
| 4,772,648 | 9/1988 | Demangeon et al. | 524/61 |
| 4,879,326 | 11/1989 | Demageon et al. | 524/61 |
| 4,970,025 | 11/1990 | Demageon et al. | 252/357 |
| 5,045,576 | 9/1991 | Roeck et al. | 524/60 |
| 5,085,896 | 2/1992 | Marks et al. | 427/412.1 |
| 5,110,627 | 5/1992 | Shoesmith et al. | 427/208.4 |

*Primary Examiner*—Richard D. Lovering
*Assistant Examiner*—N. Bhat
*Attorney, Agent, or Firm*—J. David Wharton; Shook, Hardy & Bacon

[57] ABSTRACT

The present invention relates to an asphalt-rubber emulsion useful as a joint and crack sealant that can be applied to concrete and asphalt at ambient temperatures, and to a method for producing same. The aqueous emulsion comprises a polymeric surfactant and the reaction product of an asphalt-elastomer mixture, a liquid rubber, and a peroxide cross-linking agent. The emulsion has a relatively high solids content and a relatively high rubber content.

22 Claims, No Drawings

EMULSIFIED SEALANT HAVING A HIGH SOLIDS CONTENT

BACKGROUND AND SUMMARY OF THE PRESENT INVENTION

The present invention relates to a modified asphalt filler and sealant composition that is useful for repairing joints or cracks in concrete and asphalt surfaces. More specifically, this invention relates to an asphalt-rubber emulsion useful as a filler and sealant material that can be applied to concrete or asphalt at ambient temperatures.

Modified asphalt filler and sealant materials are commonly utilized to repair cracks, joints and other crevices in concrete and asphalt surfaces. To prevent roadway deterioration caused by water intrusion at concrete slab junctures for example, or through an asphalt surface crack, the filler material must completely seal the crack. In addition, the filler material should provide a seal that is not susceptible to deterioration caused either by traffic stress, or by the contraction and expansion of surrounding concrete during freeze thaw cycles. Therefore the filler material must exhibit elasticity, flexibility, good adhesion to the walls of a joint, and overall resistance to cracking and failure.

In order to obtain a sealant having these desired physical properties, it is known to add rubber or other elastomer modifiers to asphalt. In the past, these asphalt-rubber sealants have been applied while hot so that the sealant material is fluid. This permits easy pour application such that the void is completely filled and adhesion to the joint walls is enhanced. Although these "hot pour" sealants have utility, there are some problems associated with their use. One such problem is the necessity to have heating equipment, namely, oil jacketed double boilers, at the work site. This bulky equipment has to be transported to the site by special vehicles and must be cleaned, along with the applying apparatus, at the end of each work day. Another practical problem associated with the use of combustion heaters and hot asphalt materials is the risk of fire and accidental burn injuries. Aside from these more or less irritating and cumbersome problems, the effectiveness of the sealant material can be reduced by thermal degradation which accompanies high temperature maintenance for relatively long periods of time.

Due to the problems associated with hot pour sealants, proposals have been made to provide a filler and sealant material comprising a water-based emulsion of asphalt and rubber that can be applied cold. In general, the asphalt and rubber components are first blended and can be reacted with a cross-linking agent to provide an elastic and uniform asphalt-rubber base composition. This composition is then emulsified with an aqueous medium to provide the cold pour emulsion. By providing the asphalt-rubber components in an emulsion form, they can be applied cold. Following application, the aqueous component of the emulsion evaporates and the resulting dry emulsion residue remains as a filler and sealant. Although asphalt-rubber emulsions represent a potential alternative to the hot pour sealants previously utilized, it has proven difficult to successfully obtain emulsions that exhibit the properties necessary to compete as a viable alternative.

One such difficulty relates to the amount of water present in the emulsion, and correspondingly, to the solids content of the emulsion. A certain minimum amount of water is needed to provide a uniform emulsion that is fluid enough for cold pour applications. However, an emulsion having a relatively high water content takes longer to dry and therefore delays use of the repaired roadway following application. Furthermore, an aqueous emulsion having a relatively low asphalt rubber solids content and a correspondingly high aqueous content will shrink upon evaporation of the water content. This shrinkage results in a failure to adequately fill and seal the repaired crack or joint. Therefore, it is desirable to provide an emulsion comprising a minimum amount of water to permit cold pour application and a relatively high solids content so that upon application, the sealant will dry quickly and without significant shrinkage.

In order to provide a uniformly blended emulsion having a relatively high solids content, it is known to utilize an asphalt-rubber base composition for emulsification that has a relatively low viscosity. These less viscous compositions tend to be more easily emulsified and provide an emulsion with a suitable viscosity for cold pour application. However, even though the emulsifiability of the solids is enhanced by using less viscous asphalt-rubber blends, other desirable properties of the emulsion residue, such as good elasticity, may be diminished by their use. For example, an asphalt-rubber composition that is highly cross-linked tends to exhibit a relatively high viscosity. Therefore, even though it is desirable to cross-link the asphalt-rubber components of the emulsion to provide a uniformly elastic residue, excessive cross-linkage is avoided so that a less viscous composition is provided for emulsification. In the past, this has been accomplished by cross-linking the asphalt-rubber compositions via slow reactions that last for a relatively long period of time, such as those utilizing styrene monomers for example, and that result in a loosely cross-linked asphalt-rubber blend having the requisite viscosity. Another factor that can effect the viscosity of an asphalt-rubber composition is the amount of rubber present in the composition. Thus, it is also known to prepare asphalt-rubber compositions for emulsification that have a relatively small amount of rubber and correspondingly lower viscosity.

Although some of the emulsion compositions heretofore provided have been prepared in a manner to enhance the emulsification of a relatively high amount of asphalt-rubber solids, the resulting emulsion residue often lacks other desirable properties such as enhanced elasticity, viscosity and resilience. Notably, a reduction in cross-linkage or in rubber content reduces the elasticity of the sealant material. In addition, the styrene monomers commonly utilized in slow cross-linking reactions tends to polymerize to form a hard polystyrene component in the composition. The presence of this polystyrene component reduces stress relaxation, elasticity and the overall bonding properties of the emulsion residue. Furthermore, the emulsion residues made in the past having a relatively low viscosity for emulsification purpose generally also have a relatively low softening point. During summer months at temperatures above about 90° F., for example, the asphalt roadway surfaces become very hot and these residues may require dusting for traffic use. In short, reduced viscosity, cross-linking, and rubber content for practical processing purposes is not necessarily desired for operational purposes. Although the emulsion needs to have a relatively low viscosity to permit pouring application at ambient temperatures, it is preferable to provide an emulsion residue that is highly cross-linked, having a relatively high amount of rubber such that it exhibits superior elasticity, and having a relatively high viscosity.

Many of the important properties that determine the overall effectiveness of a sealant material such as the ability of good adherence and bonding at high and low temperatures, good elasticity such that the seal lasts for a long time without deterioration, and a high solids content to prevent shrinkage and prolonged drying times have heretofore been lacking in the art. In summary, an emulsified cold pour sealant that is equal to or superior to known hot pour sealants in overall performance is lacking in the art.

It is there an object of the present invention to provide an emulsified sealant having a high solids content wherein the emulsion residue exhibits good elasticity, stress relaxation, bond, and adhesion properties.

Another object of the present invention is to provide an emulsified sealant having a high solids content that has a relatively low viscosity to permit application at ambient temperatures.

It is another object of the present invention to provide an emulsified sealant having a high solids content wherein the emulsion residue has a relatively high rubber content.

A further object of the present invention is to provide an emulsified sealant having a high solids content wherein the asphalt and elastomer components of the emulsion are reacted to form a highly cross-linked asphalt-elastomer matrix.

Still another object of the present invention is to provide an emulsified sealant having a high solids content wherein the asphalt and elastomer components of the emulsion are reacted in the presence of a peroxide cross-linking agent.

A further object of the present invention is to provide an emulsified sealant having a high solids content wherein the asphalt-rubber base has a relatively high viscosity prior to emulsification.

It is another object of the present invention to provide an emulsified sealant having a high solids content wherein the emulsion residue has a relatively high softening point so that roadway dusting is not required during summer months.

A further object of the present invention is to provide an emulsified sealant having a high solids content which dries relatively quickly upon application so that the repaired roadway can be opened for traffic or other use within a short period of time following application.

A further object of the present invention is to provide an emulsified sealant having a high solids content wherein the emulsion residue does not shrink following application.

It is another object of the present invention to provide an emulsified sealant having a high solids content that meets the requirements of ASTM D 3405 which is directed to hot pour joint sealants for concrete and asphalt pavements.

Another object of the present invention is to provide an emulsified sealant having a high solids content that effectively fills and seals cracks or joints in concrete or asphalt surfaces such that the emulsion residue does not deteriorate over time.

It is another object of the present invention to provide an emulsified sealant having a high solids content for application to a crack or joint in concrete or asphalt surfaces, wherein the emulsion residue exhibits superior bond and adhesion to the walls of the joint even at relatively low temperatures.

A further object of the present invention is to provide an emulsified sealant having a high solids content wherein the emulsion is substantially solvent free to avoid volatile organic chemical evaporation, and to avoid unpleasant odors and health risks to the applicator.

Another object of the present invention is to provide a method for producing an emulsified sealant having a high solids content meeting all of the objectives heretofore mentioned that requires a relatively short production time, thereby providing a more efficient and economical sealant material.

These and other objects of the present invention are achieved by a stable aqueous emulsion comprising a polymeric surfactant and the reaction product of an asphalt-elastomer mixture, a liquid polybutadiene, and a cross-linking peroxide agent wherein the reaction occurs at elevated temperatures for a relatively short period of time. In a preferred embodiment, the emulsion may additionally include an oil modified paraffin wax, a zircoaluminate coupling agent and a vinyl acetate latex thereby providing an emulsion for use as a joint sealant that meets the requirements of ASTM D 3405. The present invention is also directed to a process for preparing the composition wherein an emulsion having a relatively high solids content, preferably ranging from 70 to 85% solids and most preferably from 73 to 80% solids, is prepared. The emulsion residue has a relatively high elastomer content, preferably at least about 8% by weight of the residue is elastomer.

The emulsion of the present invention has good stress relaxation properties which enable the residue to pass stringent low temperature bond tests. The emulsion has good low and high temperature cohesive and adhesive properties such that the seal will not deteriorate upon expansion or contraction of the underlying concrete. The emulsion residue exhibits good adherence to the sidewalls of the crack or joint and exhibits good elasticity such that the material is very rubbery and not brittle.

The composition can be used as a concrete or asphalt crack sealer, joint sealer, filler, an overlay sealant for construction materials and the like.

DETAILED DESCRIPTION OF THE PRESENT INVENTION

The emulsified asphalt-rubber composition of the present invention is prepared by a three-step process. In the first step, an asphalt elastomer mixture is prepared by mixing an asphalt component and an elastomer component at a relatively high temperature, preferably ranging from 300° to 400° F. and most preferably at about 350° F., until the mixture is homogeneous. A high shear mixer or a cowles disperser is especially suitable for mixing purposes.

In the second step of the process, the homogeneous mixture is transferred to a reactor and maintained at a slightly lower temperature preferably ranging from about 250° to 350° F., and most preferably at about 300° F. A liquidrubber, such as liquid polybutadiene, and a cross-linking peroxide agent is added to the asphalt-elastomer mixture to form the reaction mixture. The temperature of the reaction mixture is raised slightly, preferably to about 300° to 400° F. and most preferably to about 350° F. This temperature is maintained for a relatively short period of time until the cross-linkage reaction is completed, preferably for about thirty minutes to three hours and with about one hour being most preferred. Following the cross-linkage reaction, a polymeric surfactant such as a modified polyester surfactant, and optionally an oil modified paraffin wax is added to the reacted asphalt-rubber composition to form the asphalt-rubber base.

The third step of the present invention comprises emulsifying the asphalt-rubber base to form an emulsion having a relatively high solids content preferably ranging from 70 to 85%, and most preferably from 73 to 80% by weight solids. The asphalt-rubber base is heated to a relatively high temperature ranging from about 300° to 330° F. and added to an emulsification medium that is at room temperature. In addition to suitable emulsifying agents, the emulsification medium preferably also includes a zircoaluminate coupling agent which promotes concrete surface adhesion. A vinyl acetate latex can optionally be added to the prepared emulsion to enhance adhesion of the emulsion residue to asphalt.

The asphalt ingredient of the present invention can be any known asphaltic material having a penetration ranging from 200 to 600 at 77° F. and is preferably an asphalt flux. The asphalt component is generally present in an amount ranging from about 60 to 90%, and preferably 65 to 80% by weight of the asphalt-rubber base.

The elastomer ingredient of the present composition can comprise any rubbery or elastomeric material including natural rubber and synthetic rubbers, either alone or as an elastomer blend. The elastomeric component is provided to enhance various physical properties of the asphalt, and should be chosen so as to provide an emulsion with the desired elasticity, flexibility, bond, resilience and other properties. For purposes of providing a sealant material for roadway application meeting the bond, penetration, resilience and other requirements set forth in ASTM standards, particularly suitable elastomers include materials formed by copolymerization of one or more conjugated dienes, such as butadiene, isoprene, and chloroprene with one or more ethylenic monomers such as styrene. Of these, copolymers of styrene and butadiene are preferred. Generally, the moiety of styrene and butadiene in the copolymer is not critical, but it is preferred to employ a copolymer in is which the butadiene moiety is in a major amount and a styrene moiety in a minor amount. Preferred copolymers will have a butadiene moiety of in excess of about 65% and a styrene moiety of less than about 35%. The elastomer component is preferably present in an amount over 8% by weight, most preferably ranging from 9 to 13% by weight of the asphalt-rubber base.

In a preferred embodiment of the present invention, the elastomer component comprises a blend of styrene butadiene rubbers and a styrene butadiene block copolymer, wherein the amount of styrene moiety present in each is less than about 35%. A particularly suitable blend comprises a diblock styrene butadiene rubber, a linear styrene butadiene rubber and a linear styrene-butadiene-styrene block copolymer.

Among other properties, the diblock styrene butadiene rubber (SBR) tends to enhance the softening point and viscosity of the emulsion residue. As noted earlier, a relatively high viscosity and softening point of the asphalt-rubber base prior to emulsification is considered preferable for purposes of the present invention. An example of a suitable diblock SBR is a diblock SBR comprising about 25% styrene, such as that commercially available under the trade designation Housemex 1205 from Housemex, Inc. The housemex 1205 has been found particularly useful in providing a residue having a relatively high softening point. For best results the diblock styrene butadiene rubber is present in amounts ranging from 3 to .7% of the asphalt-rubber base prior to emulsification.

The linear styrene butadiene rubber (SBR) is particularly useful for providing an emulsion residue meeting ASTM resilience requirements. An example of a suitable linear SBR is a linear SBR comprising about 30% styrene such as that commercially available under the trade designation Enichem 166 from Enichem America, Inc. For best results the linear SBR should be present in amounts from about 1 to 5% by weight of the asphalt-rubber base prior to emulsification.

The preferred styrene butadiene block copolymer is a copolymer having at least two styrene blocks per molecule and can be arranged either in a linear or a branch setup. A linear block styrene-butadiene-styrene copolymer is most preferred. The block copolymer should contain from about 23 to about 40% by weight of styrene and preferably from about 25 to about 35% styrene. The linear SBS is particularly useful for enhancing the adhesive strength of the final emulsion and is partially responsible for reducing the emulsion residue penetration such that roadway application standards are met. Examples of specific styrene butadiene copolymers include various thermoplastic Kraton compounds made by Shell Oil Company such a that sold under the trade designation Kraton D 1102. For best results, the linear styrene-butadiene-styrene copolymer is present in amounts ranging from 1 to 5% by weight of the asphalt-rubber base. The elastomers of the elastomeric component and the asphalt flux are mixed together at an elevated temperature preferably ranging from about 300° to 400° F. and under high shear conditions until the mixture is homogeneous.

A liquid rubber, and preferably a liquid polybutadiene, is added to the asphalt elastomer mixture in amounts preferably ranging from 2 to 6% by weight, and most preferably 2.5 to 4.5% by weight, of the asphalt-rubber base prior to emulsification. Suitable liquid polybutadienes include hydroxy terminated polybutadiene, butadiene acrylonitrile polymers or butadiene styrene copolymers. The polybutadiene is useful in enhancing low temperature properties such as low temperature flexibility and also enhances adhesion of the emulsion residue to concrete such that stringent bond tests are passed.

A cross-linking agent, and preferably a peroxide cross-linking agent is added to the asphalt elastomer mixture in amounts ranging from 0.05 to 3% by weight, preferably 0.1 to 1.5% by weight of the asphalt-rubber base prior to emulsification, to form the reaction mixture. Particularly suitable peroxides include organic dialkyl peroxides such as ditertiary butyl peroxide and dicumyl peroxide. The reaction mixture is heated wherein the temperature is raised to about 350° F. and held for about thirty minutes to three hours, and most preferably for about one hour, until completion of the cross-linkage reaction. A tightly cross-linked network is provided by this reaction and the resulting asphalt-rubber blend exhibits superior elasticity.

Once the cross-linking reaction is completed, a polymeric surfactant, preferably of the polyester type, is added in an amount of 0.5 to 3% by weight, preferably 0.6 to 2.0% by weight, of the asphalt-rubber base prior to emulsification. A particularly suitable polymeric surfactant is a modified polyester nonionic surfactant having a high molecular weight such as that commercially available under the trade designation Hypermer A60 from ICI Industries Americas, Inc. of Wilmington, Del. This surfactant is particularly useful in facilitating emulsification such that a high solids content can be obtained and also so that the asphalt-elastomer viscosity does not have to be relatively low to permit emulsification. The present invention therefore provides a method for emulsifying the asphalt and elastomer/rubber constituents wherein the asphalt-rubber base and the emulsion residue has a relatively high viscosity, yet the aqueous emulsion has a relatively low viscosity such that cold pour application is possible.

An oil modified paraffin wax is optionally added to the reacted asphalt-rubber mixture to reduce residue penetration such that roadway application is permitted. Preferably, the oil modified paraffin wax will have an oil content ranging from 15 to 30% by weight such as that commercially available under the trade designation HUB 3-1 Wax from Borcke Industries. The oil modified paraffin wax is optionally present in an amount preferably ranging from 4 to 10% by weight and most preferably 5 to 8% by weight of the asphalt-rubber base prior to emulsification.

The asphalt-rubber base of the present invention is easily emulsified using conventional equipment and emulsifiers. While any high speed, high shear emulsion producing mechanical devices may be used, a colloid mill is quite suitable for producing the emulsion from the above reacted asphalt-rubber base. Preferably the emulsion mill is fitted with a heat exchanger to ensure an emulsion outlet temperature of below about 130° and a back pressure valve to prevent boiling in the mill head.

The emulsification medium may comprise any of the well known and widely used asphalt emulsifiers, and can be cationic, anionic, or nonionic, with cationic being preferred. It is noted that although anionic emulsifiers can be used, the dry time of an emulsion prepared with an anionic emulsifier is unsuitably long. Generally, cationic emulsions are preferred and the fatty amines, most desirably a polyamine, are particularly useful in combination with an ammonium salt. The emulsifying agents should be present in amounts ranging from about 0.1 to 4% by weight of the total emulsion.

In accordance with the best mode of this invention, a mixture of a polyamine emulsifier in amounts ranging from 0.1 to 2% by weight, preferably 0.2 to 0.6% by weight of the emulsion and a quarternary ammonium salt in amounts ranging from 0.1 to 1.5% by weight, preferably 0.5 to 1.0% by weight, of the total emulsion is used. A suitable polyamine emulsifier is a tallow tetramine such as that commercially available under the trade designation AE-9 from Jetco chemicals, Inc. in Corsicana, Tex. A suitable ammonium salt is a tallow pentamethyl ammonium chloride and isopropanol mixture such as that commercially available under the trade designation AE-7 from Jetco Chemicals, Inc. in Corsicana, Tex. A minor amount of a mineral acid, preferably hydrochloric acid, can be added to the emulsification medium to maintain a solution pH of about 3 to 5. A suitable amount of acid for this purpose preferably ranges from about 0.05 to 2.0% by weight of the total emulsion.

A zircoaluminate coupling agent can optionally be added to the emulsification medium to promote concrete adhesion. Suitable amounts range from about 0.05 to 2.0% by weight of the emulsion. A useful coupling agent is an aminozircoaluminate solution provided in about 20% methanol such as that commercially available under the trade name Manchem A from Rhone Poulenc Inc. in Monmouth Junction, N.J. The solids content of the emulsion should range from 50 to 90, preferably 70 to 85, and most preferably from 73 to 80% solids.

Following emulsification, a vinyl acetate latex in amounts ranging from about 1 to 4%, preferably 2 to 3%, by weight of the total emulsion is optionally added to further enhance adhesion of the emulsion residue to asphalt. A suitable latex includes an ethylene vinyl acetate latex such as that commercially available under the trade designation Airflex 525 BP from Air Products and Chemicals Inc. of Allentown, Pa.

In accordance with the best mode of practicing the present invention, the materials and the amounts employed will be selected to produce an emulsion having a relatively low viscosity ranging from 70 to 110 krebs, and an emulsion residue having a relatively high viscosity preferably above about 125,000 cps, most preferably ranging from 150,000 to 200,000 cps, at 210° F. and a residue softening point ranging from about 170° to 230° F., preferably 185° to 200° F.

The asphalt-rubber emulsion of the present invention possesses suitable viscosity and flow characteristics to be applied as a cold pour crack and joint filler or sealant either by simply pouring the emulsion into the crack or by filling the crack with the emulsion under pressure dispensed from a wand. The emulsion residue exhibits good low and high temperature cohesion and adhesion to substrates, in addition to substantially increased elasticity, good resilience and enhanced stress relaxation properties.

The emulsion of the present invention is suitable for highway application and the preferred embodiment provides a residue, when dried to a relatively water free state, meeting the stringent standards of ASTM D 3405 for hot pour sealants as hereafter listed:

(a) a penetration at 77° F. (25° C.) not exceeding 90 decimillimeters (dmm) when tested according to ASTM D5 standards using a penetration cone conforming to the requirements of ASTM D 217 instead of a penetration needle.

(b) resilience of 60% higher tested by ASTM D 5 standards.

(c) a flow at 140° F. (60° C.) not to exceed 5 millimeters (mm). A sample is molded to a size 60 mm × 40 mm × 3.2 mm, cooled and heated in an oven at 140° F. at an angle of 74° for 5 hours. The change in length from the molded length (60 mm) is measured.

(d) five complete bonding cycles with 100% extension at 0° F. (−17.8° C.) and three complete bonding cycles with 50% extension at −20° F. Cement blocks 1×2×3 inch with a ½ inch wide open space are prepared, cured, and ground to expose aggregate. Each test specimen is molded between two such blocks spaced 1 inch apart. Each specimen is cured at 0° F. and −20° F. respectively for at least 4 hours. The blocks are extended 0.5 inch and 0.25 inch at a rate of 0.125 inch per hour, thus extending the specimen 100% and 50% respectively. Each specimen is recompressed at room temperature for 2 hours to its original thickness Five such cycles of extension at 0° F. and three such cycles of extension at −20° F., and recompression at room temperature constitutes one complete bond test.

While the above describes the invention with sufficient particularity to enable those skilled in the art to make and use same, nonetheless further exemplification follows.

EXAMPLE I

Table I sets forth preferred ranges and a suitable composition made in accordance with the best mode of this invention.

TABLE I

| Ingredient | Range | Preferred (Weight %) | Composition I |
|---|---|---|---|
| Asphalt-Rubber Base | | | |
| Asphalt | 60–90 | 65–80 | 74 |
| Elastomer | 5–17 | 8.0–13.0 | 10.6 |
| Diblock SBR | 3–7 | 4.5–6.5 | 5.3 |
| Linear SBR | 1–5 | 2.0–3.5 | 2.7 |
| Linear SBS | 1–5 | 2.0–3.5 | 2.7 |
| Polybutadiene | 2–6 | 2.5–4.5 | 3.4 |
| Peroxide | 0.05–3.0 | 0.1–1.5 | 0.8 |
| Polymeric surfactant | 0.5–3.0 | 0.6–2.0 | 1.2 |
| Paraffin Wax | 4–10.0 | 5.0–8.0 | 9.9 |
| Emulsion Product | | | |
| Water | 15–45 | 20–40 | 23 |
| Asphalt Rubber Base | 60–90 | 70–85 | 73 |
| Emulsifying Agent | 0.1–4.0 | 0.3–2.5 | 1.5 |
| HCl | .05–2.0 | 0.2–1 | 0.3 |
| Zircoaluminate | .05–2.0 | 0.1–1 | 0.2 |
| Ethylene Vinyl Acetate Latex | 1.0–4.0 | 2.0–3.0 | 2.5 |

Several compositions made in accordance with the present invention having the following component amounts were prepared.

TABLE II

| Ingredient | Weight % |
|---|---|
| Asphalt-Rubber Base | |
| Asphalt | 76.0 |
| Housemex 1205 | 5.6 |
| Enichem 166 | 2.8 |
| Kraton 1102 | 2.8 |
| Polybutadiene | 3.5 |
| Peroxide | 0.8 |
| Hypermer A-60 | 0.75 |
| Hub 3-1 | 7.0 |
| Emulsion Product | |
| Water | 20.88 |
| asphalt-rubber base | 75.2 |
| Jetco AE-7 | .69 |
| Jetco AE-9 | .35 |
| Manchem A | .17 |
| HCl | .28 |
| Airflex 525 bp | 2.4 |

A first composition was prepared in accordance with this invention by raising the reaction temperature to 350° F. following addition of the peroxide agent to the asphalt-rubber. After reaching a temperature of 330° F., the temperature was maintained for 30 minutes. The emulsion was then prepared following addition of the Hypermer surfactant and paraffin wax. The resulting emulsion had a melting point of 196.2° F., a penetration of 92 dmm and resilience of 85%.

A second composition was prepared in accordance with this invention by raising the reaction temperature to 350° following addition of the peroxide agent to the asphalt-rubber base. After reaching a temperature of 330° F., the temperature was maintained for one hour. The emulsion was then prepared following addition of the Hypermer surfactant and paraffin wax. The resulting emulsion had a melting point of 195.9° F., a penetration of 78 dmm, and a resilience of 80%.

A third composition was prepared similarly to the above-described second composition differing only in that a higher wax content of 10% by weight of the asphalt-rubber base was utilized. The resulting emulsion had a melting point of 196° F., a penetration of 75 dmm, and a resilience of 70%.

EXAMPLE III

The following compositions were prepared in accordance with the present invention:

TABLE III

| Ingredient | I | II (Weight %) | III |
|---|---|---|---|
| Asphalt-Rubber Base | | | |
| Asphalt | 82 | 78 | 75 |
| Housemex 1205 | 6.0 | 5.7 | 5.4 |
| Enichem 166 | 3.0 | 2.8 | 2.7 |
| Kraton 1102 | 3.0 | 2.8 | 2.7 |
| Polybutadiene | 3.8 | 3.7 | 3.4 |
| Peroxide | 1.3 | .82 | .8 |
| Hypermer A-60 | 0.78 | 0.87 | 1.1 |
| Hub 3-1 | 0 | 4.7 | 8.9 |
| Emulsion Product | | | |
| Jetco AE-7 | 0.73 | 0.76 | 0.76 |
| Jetco AE-9 | 0.37 | 0.38 | 0.38 |
| Manchem A | 0.25 | 0.38 | 0.38 |
| HCl | 0.12 | 0.30 | 0.30 |
| Airflex 525 bp | 0.0 | 2.43 | 2.43 |
| Water | 30 | 21 | 23 |
| Asphalt Rubber Base | 68.5 | 75.5 | 75.5 |

The following table lists the properties of each composition prepared. Note that addition of the paraffin wax significantly reduces penetration.

TABLE IV

| | I | II | III |
|---|---|---|---|
| Penetration (dmm) | 148 | 105 | 71 |
| Resilience (%) | 68 | 75 | 74 |
| Melt point (°F.) | 184.6 | 185 | 190 |
| Flow | zero | zero | zero |
| bond | | | |
| (5 cycles at 0° F.) | pass | pass | pass |
| (3 cycles at −20° F.) | pass | pass | pass |

We claim:

1. An asphalt-rubber composition for use in forming an aqueous emulsion that is pourable at room temperature, said composition comprising:
   60–90% by weight asphalt;
   in excess of 8% by weight rubber elastomer, at least 2% by weight comprising a liquid rubber; and
   0.5–3% by weight of a polymeric surfactant,
   said asphalt and said rubber being reacted at 300°–400° F. with a peroxide cross-linking agent present in a quantity of 0.05 to 3% by weight of the combined asphalt and rubber mixture.

2. A composition according to claim 1 wherein the viscosity of said composition ranges from about 125,000 to 200,000 cps at 210° F.

3. A composition according to claim 1 wherein said polymeric surfactant is a high molecular weight polyester.

4. A composition according to claim 1 wherein said asphalt-elastomer mixture comprises an asphalt flux, said flux having a penetration ranging from 200 to 600.

5. A composition according to claim 1 wherein said asphalt-elastomer mixture comprises at least one styrene butadiene copolymer, said copolymer comprising at least 65% by weight butadiene.

6. A composition according to claim 1 wherein said asphalt-elastomer mixture comprises a linear styrene butadiene rubber, a diblock styrene butadiene rubber and a linear styrene-butadiene-styrene copolymer.

7. An aqueous asphalt rubber emulsion that is pourable at room temperature, said emulsion comprising:
   60–90% by weight asphalt;
   in excess of 8% by weight rubber, at least 2% by weight comprising liquid rubber;
   0.5–3% by weight of a polymeric surfactant,
   said asphalt on said rubber being reacted at 300°–400° F. with a peroxide cross-linking agent present in a quantity of 0.5 to 3% by weight of the combined asphalt and rubber mixture;
   0.1–4.0% by weight emulsifier; and water.

8. An emulsion according to claim 7 wherein said aqueous emulsion has a viscosity ranging from about 70 to 100 krebs.

9. An emulsion according to claim 7 wherein said asphalt-rubber composition additionally comprises paraffin wax.

10. An emulsion according to claim 7 wherein said aqueous emulsion additionally comprises a zircoaluminate coupling agent.

11. An emulsion according to claim 7 wherein said aqueous emulsion additionally comprises a vinyl acetate latex.

12. An emulsion according to claim 7, wherein said polymeric surfactant is a high molecular weight polyester.

13. An emulsion as set forth in claim 7, wherein said asphalt-elastomer mixture comprises an asphalt flux, said flux having a penetration ranging from 200 to 600.

14. An emulsion as set forth in claim 7, wherein said asphalt-elastomer mixture comprises at least one styrene butadiene copolymer, said copolymer comprising at least 65% by weight butadiene.

15. An emulsion as set forth in claim 7, wherein said asphalt-elastomer mixture comprises a linear styrene butadiene rubber, a diblock styrene butadiene rubber and a linear styrene-butadiene-styrene copolymer.

16. A method for producing an aqueous emulsion that is pourable at ambient temperatures, said method comprising:
   mixing an asphalt component and an elastomer component at an elevated temperature to form a homogeneous asphalt-elastomer mixture;
   adding at least 2% by weight liquid rubber to said asphalt-elastomer mixture;
   reacting said asphalt-elastomer and liquid rubber mixture in the presence of 0.05 to 3% by weight of a peroxide crosslinking agent at a temperature of 300°–400° F. to form a reaction product;
   blending said reaction product with a polymeric surfactant to form an asphalt-rubber base; and
   emulsifying said asphalt-rubber base in the presence of at least one emulsifier to form an aqueous emulsion.

17. A method according to claim 16 wherein said emulsifying step comprises emulsifying said asphalt-rubber base to form an emulsion comprising from 70 to 85% solids.

18. A method according to claim 16 wherein said blending step additionally comprises blending a paraffin wax with said reaction product.

19. A method according to claim 16 wherein said emulsifying step additionally occurs in the presence of a zircoaluminate coupling agent.

20. A method according to claim 16 wherein said method additionally comprises a final step of adding a vinyl acetate latex to said aqueous emulsion.

21. A method according to claim 16 wherein is included the step of reducing said temperature prior to adding said liquid rubber.

22. A method according to claim 13 wherein said reacting step comprises continuing said reaction for one to three hours.

* * * * *